Dec. 26, 1944.  W. E. GARWOOD  2,365,693
HYDRAULIC TESTING MACHINE
Filed July 17, 1943  2 Sheets-Sheet 1
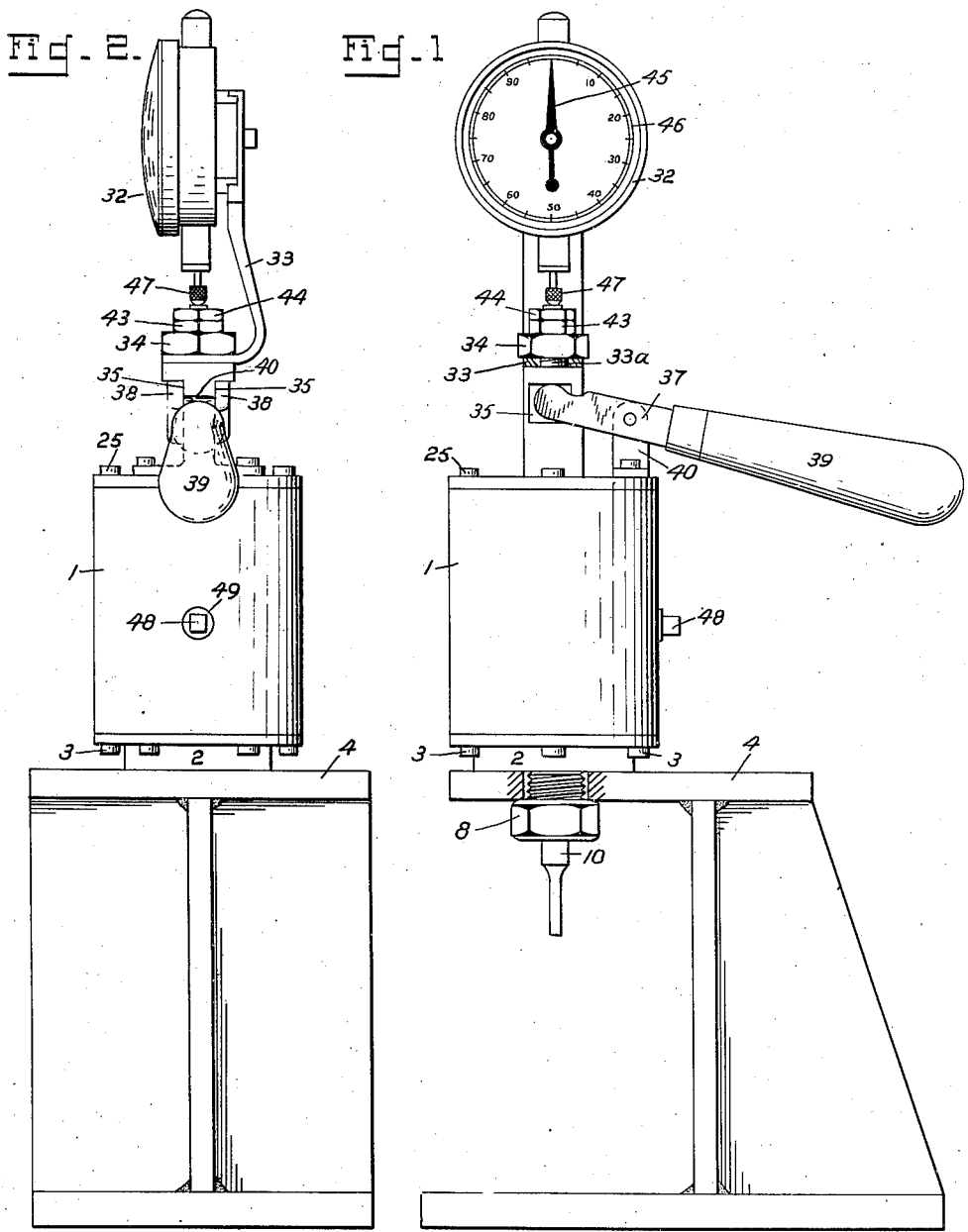
Inventor
William E. Garwood

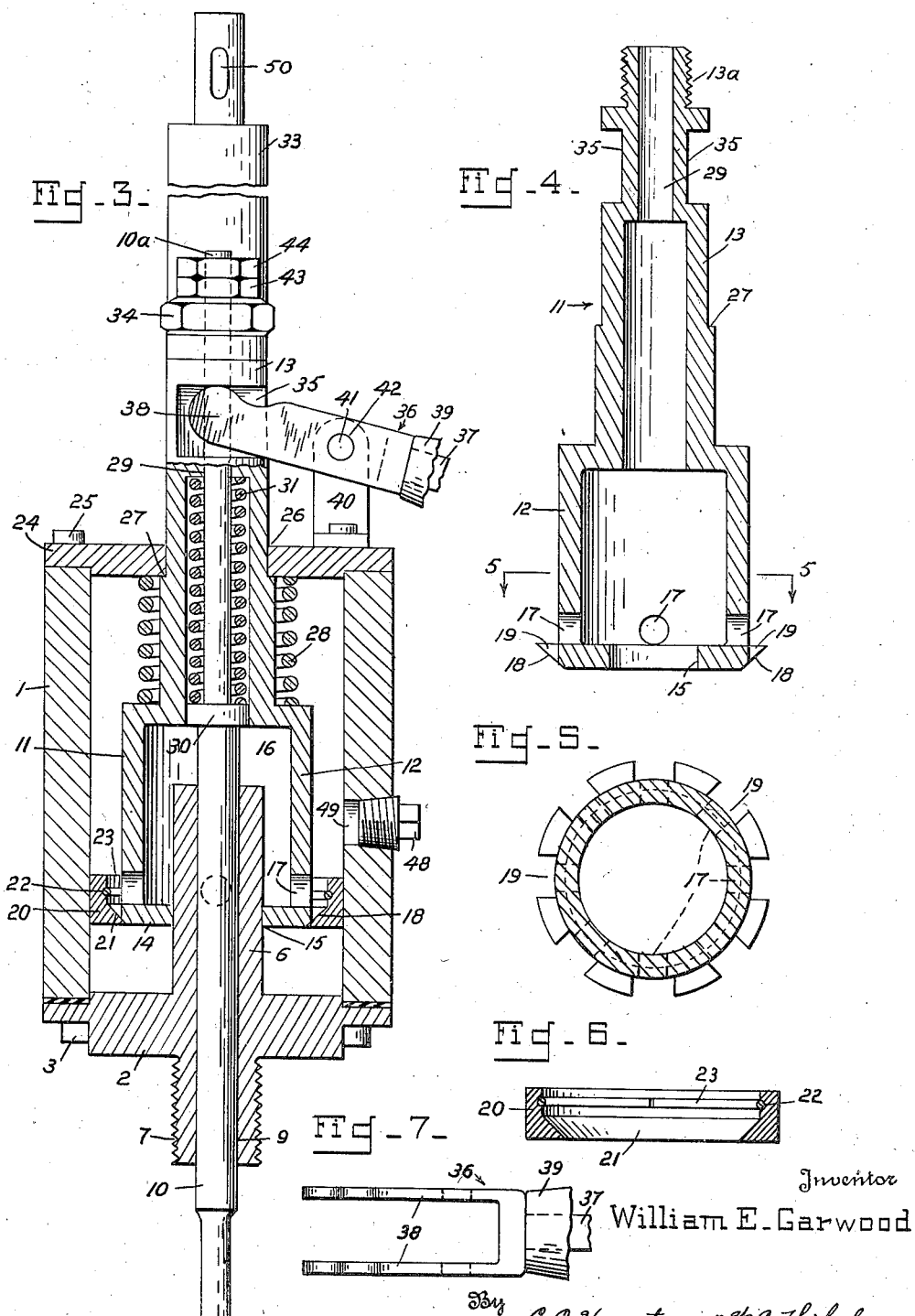
Dec. 26, 1944.  W. E. GARWOOD  2,365,693
HYDRAULIC TESTING MACHINE
Filed July 17, 1943   2 Sheets-Sheet 2
Inventor
William E. Garwood
By C. E. Herrstrom & W. E. Thibodeau
Attorneys Patented Dec. 26, 1944

2,365,693

UNITED STATES PATENT OFFICE 2,365,693

HYDRAULIC TESTING MACHINE

William E. Garwood, Springfield, Mass.

Application July 17, 1943, Serial No. 495,209

8 Claims. (Cl. 73—141)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a hydraulic testing machine.

Accurate determination of the force required to release certain types of mechanisms has been accomplished only with difficulty by known methods. One such mechanism is the sear release mechanism utilized in machine guns. A maximum and minimum release load is generally prescribed for such a mechanism. Improvised devices were usually employed to determine whether the sear release mechanism conformed to the prescribed loadings. For example, a rod was secured to one end of a hand spring scale in such a manner that when the rod was applied to the sear release mechanism and pressure brought to bear on the scale the pressure required to release the sear mechanism would be registered on the scale.

With such improvised devices it is readily appreciated that a steadily applied load cannot be maintained due to the human element. Therefore any series of readings obtained in this manner will not be consistent or reliable. Furthermore the rate of applying a load cannot be controlled to any great extent and unless the application of the load is consistent comparative results will not be obtained. It is also desirable that such loading be applied to the sear release mechanism slowly in order to obtain a more accurate reading.

Accordingly it is an object of this invention to provide a hydraulic testing machine for exerting an accurately measurable force.

Another object of this invention is to provide a hydraulic testing machine for the gradual application of an accurately measurable force to determine the releasing force of certain types of mechanisms.

The specific nature of the invention as well as other objects and advantages thereof will clearly appear from a description of a preferred embodiment as shown in the accompanying drawings in which:

Fig. 1 is a front elevational view of the hydraulic testing machine.

Fig. 2 is a right side elevational view of Fig. 1.

Fig. 3 is a longitudinal sectional view of the hydraulic testing machine shown without the supporting stand.

Fig. 4 is an enlarged longitudinal sectional view of the piston.

Fig. 5 is a cross sectional view taken on the plane 5—5 of Fig. 4.

Fig. 6 is a cross sectional view of the valve showing the beveled interior surface and the valve retaining ring.

Fig. 7 is a partial top elevational view of the forked end of the operating handle.

The hydraulic testing machine embodying this invention is shown in assembled relation in Fig. 1. A cylinder 1 is provided and slidably mounted within the cylinder 1 is a cooperating piston 11 which will be described. A base 2 is secured to the bottom of cylinder 1 by the bolts 3. In the center of base 2 there is provided a long integral hub 6. An axial hole 9 is provided in the hub 6 to receive a plunger 10 to be described. The downwardly projecting portion of hub 6 is provided with threads 7 to receive a lock nut 8. The cylinder assembly is supported on a suitable bracket 4 by insertion of the lower portion of hub 6 in a suitable hole in the bracket and fastening the nut 8 to the threads 7.

Piston 11 comprises a piston head 12 and a piston extension 13. An axial hole 15 provided in the face 14 of piston head 12 accommodates the inwardly projecting portion of hub 6. The piston head 12 is counterbored to form an oil chamber 16. Near the lower edge of piston head 12 there are provided a plurality of oil escape holes 17. The bottom periphery of piston head 12 is provided with a beveled edge 18. About the beveled edge 18 and opposite each hole 17, there is provided a U-shaped notch 19 (Fig. 5). The end 13a of extension 13 is suitably threaded to receive a nut 34 for a purpose to be described later.

A valve 20 (Fig. 6) is placed about the piston head 12 surrounding the beveled edge 18 of face 14. The valve 20 is a cylindrical ring provided with an interior beveled surface 21 corresponding to the beveled surface 18 on the forward edge of piston head 12. At the termination of the beveled surface within valve 20 a cylindrical surface is provided. Approximately in the center of this cylindrical surface an annular groove 22 is provided to receive a retaining ring 23. The interior of this cylindrical surface is of substantially larger diameter than the external diameter of piston head 12 to provide free passage of the oil when the piston is raised as will be described in more detail later. Valve 20 is retained on piston head 12 by spring ring 23 which is partially engaged by groove 22.

The cover disk 24 is secured to cylinder 1 by screws 25 evenly spaced about the periphery of cover 24. An axial hole 26 in cover 24 permits piston extension 13 to pass thru cover 24 and also serves to support extension 13 in an upright position. Where the extension 13 passes thru hole 26 its diameter is somewhat reduced. This reduced diameter portion forms a shoulder 27 which provides a stop and limits the upward movement of piston 11 to the position shown in Fig. 3. A heavy piston spring 28 surrounds that portion of extension 13 within cylinder 1 and biases piston 12 downwardly to provide the necessary force for loading the plunger 10. An axial hole 29 is provided in extension 13 to receive plunger 10. Plunger 10 is a long rodlike member which projects somewhat below the bottom of hub 6 and extends up through extension 13. An integral collar 30 is provided approximately in the center of plunger 10 to act as a stop for a plunger spring 31. A portion of plunger rod 10 above the integral collar 30 is of reduced diameter to receive the plunger spring 31. The axial hole 29 in extension 13 is counterbored to receive collar 30 of plunger 10 and plunger spring 31. Plunger spring 31 should be large enough to produce the desired range of test forces. Spring 28 must be substantially stronger than plunger spring 31, in fact strong enough that a slight deflection on spring 28 will produce a force equal to the maximum to be developed by spring 28. It should be mentioned here that plunger spring 31 is so calibrated that each small fraction of an inch of deflection of plunger 10 will register a unit of loading on a dial indicator 32 as will be described. A suitable bracket 33 as shown in Fig. 2 provided with a mounting hole 33a is placed on the threaded end portion 13a of extension 13 for mounting the dial indicator 32 and is secured to extension 13 by a nut 34.

Plunger 10 is retained within extension 13 by a nut 43 screwed onto a threaded end portion 10a of plunger 10 which projects above the nut 34. The nut 43 is also used to preload spring 31 to any desired loading. A check nut 44 may be screwed down on top of nut 43. Approximately in the center of the portion of extension 13 which projects above cover 24 there are provided two oppositely disposed flat milled surfaces 35 for mounting a lever 36. The lever 36 (Fig. 7) comprises a shaft portion 37, a forked end 38, and a handle 39 suitably secured to one end of shaft 37. The forked end 38 of lever 36 surrounds the flat milled portion 35 of shaft 13 and is pivotally mounted on a suitable bracket 40. Bracket 40 is secured to cover 24 by one of the screws 25. The lever 36 pivots about a pin 41 inserted in a suitable hole 42 in bracket 40. The ends of the fork 38 are suitably rounded and bear against the upper shoulder of the milled surfaces 35.

The dial indicator 32 may be any conventional position indicator provided with an indicating needle 45, suitably graduated dial 46, and a spring biased plunger 47 to actuate needle 45. Plunger 47 of dial indicator 32 contacts the end 10a of plunger 10. Needle 45 may be readily adjusted to read zero when the piston 11 is in the upper unloaded position by moving indicator 32 upwardly or downwardly in a slotted hole 50 in the top of bracket 33. When needle 45 is in the zero position indicator 32 is locked in place by a suitable binding screw (not shown). Dial indicator 32 thus measures any downward relative movement of the piston 11 with respect to plunger 10. Since any such relative movement can occur only with compression of spring 31, the dial indicator can readily be calibrated in terms of pounds of force exerted on spring 31.

A plung 48 is removably inserted in a suitably threaded hole 49 approximately in the center of cylinder 1 in order that a suitable hydraulic fluid may be poured into the cylinder 1. It should be mentioned here that the surface of the hydraulic fluid should be maintained level with the bottom of hole 49.

When it is desired to determine the load required to release a certain mechanism, for example, the sear of a firearm (not shown) the lever 36 is pivoted downwardly by pressure applied to handle 39. This operation raises piston 11 and plunger 10 until shoulder 27 of extension 13 strikes the underside of cover 24 as shown in Fig. 3. During this movement valve 20 is opened as it is forced down by the backward pressure of the hydraulic fluid until retaining ring 22 is caught by the upper edge of beveled surface 18. The hydraulic fluid thus flows freely thru the U-shaped opening 19. The mechanism to be tested is then placed underneath plunger 10. When handle 39 is released piston 11 is then forced downwardly by the bias of spring 28. The hydraulic fluid, however, limits piston 11 to a very slow downward movement since on the downward stroke valve 20 is fully closed, that is, beveled surface 21 seats tightly against beveled surface 18 on piston head 12 to provide a good oil seal. The hydraulic fluid thus can escape only around the outside edge of valve 20 and through the clearance alongside of the hub 6. As the piston 11 progresses downwardly any resistance offered by the mechanism under test to plunger 10 produces a relative displacement of the plunger 10 with respect to piston 11, compressing spring 31 and producing a reading on dial indicator 32.

By closely observing the indicating needle 45 the loading on the mechanism under test can be readily determined when such mechanism is released by the load being applied. It will be noted that this mechanism accurately indicates instantaneous resisting forces exerted by the mechanism under test and is independent of any yielding of such mechanism under the applied forces.

To repeat the load test, handle 39 is again pushed down and such movement causes valve 20 to drop down until the valve spring 23 strikes the projecting end of piston head 12. This movement opens notches 19 so that the hydraulic fluid in chamber 16 can readily pass thru holes 17 into the cylinder below the face of piston 11. When extension 13 has been raised to its uppermost position the load testing machine is ready for another determination. Valve 20, of course, automatically closes as the piston starts its downward travel due to the pressure of the hydraulic fluid against the base of valve 20 and piston 14.

I claim:

1. A force testing device comprising a member movable under spring bias, hydraulic means operative on said member to permit such movement at a slow rate, a plunger member arranged to engage the mechanism to be tested, said plunger mounted for movement parallel to the movement of said first mentioned member, resilient means interconnecting said first mentioned member and said plunger member, said resilient means arranged to oppose relative movement of said first mentioned member with respect to said plunger member when said plunger member engages the mechanism to be tested, and means for indicating the force applied to said resilient means by the said slow movement of said first mentioned member.

2. A force testing device comprising a hydraulic cylinder, a piston, a first spring operating between said piston and one end of said cylinder, means for moving said piston to compress said spring, valve means on said piston arranged to close only during reverse movement of said piston under the force of said spring, whereby such reverse movement of said piston is hydraulically limited to a slow rate, a plunger concentrically mounted with respect to said piston, said plunger arranged to engage a mechanism to be tested, a second spring mounted between said piston and said plunger, said second spring arranged to be compressed by reverse movement of said piston under force of said first spring relative to said plunger, whereby a force is exerted on the mechanism to be tested, and means for indicating the extent of said relative movement whereby the force exerted on said plunger may be determined.

3. A force testing device comprising a hydraulic cylinder, a hollow piston reciprocable therein, a first spring operating between said piston and one end of said cylinder, means for moving said piston to compress said spring, valve means on said piston arranged to close only during reverse movement of said piston under the force of said spring, whereby such reverse movement of said piston is hydraulically limited to a slow rate, a plunger concentrically mounted within said hollow piston, said plunger arranged to engage a mechanism to be tested, and a second spring mounted within said hollow piston and operative between said piston and said plunger.

4. A force testing device comprising, a hydraulic cylinder, a piston member movable within said cylinder, a first spring operating between said cylinder and said piston member to move the latter within said cylinder, hydraulic means within said cylinder for limiting the movement of said piston member to a slow rate, a plunger member having a portion extending within said cylinder and another portion arranged to move into engagement with a mechanism to be tested, a second spring disposed between said piston member and said plunger member whereby the movement of said piston member under the bias of said first spring applies an increasing force on said plunger member when said plunger member engages the mechanism to be tested, and means for indicating the force applied to said second spring by the movement of said piston member under the bias of said first spring.

5. A force testing device as in claim 2 wherein the last mentioned means comprises a dial indicator arranged to measure the relative movement between said piston and plunger.

6. A force testing device comprising a hydraulic cylinder, a hollow piston reciprocable therein, a first spring operating between said piston and one end of said cylinder, means for moving said piston to compress said spring, a plunger concentrically mounted within said hollow piston, said plunger arranged to engage a mechanism to be tested, and a second spring mounted within said hollow piston and operative between said piston and said plunger.

7. A force testing device comprising a hydraulic cylinder, a hollow piston reciprocable therein, said piston having a hollow rod portion projecting exteriorly of said cylinder, a first spring surrounding said hollow rod and operating between said piston and one end of said cylinder, means for moving said piston with respect to said cylinder to compress said spring, a plunger concentrically mounted within said hollow piston and rod, said plunger having a portion projecting exteriorly of said cylinder and arranged to engage a mechanism to be tested, means securing said plunger to said piston rod for movement in the direction compressing said first spring, a second spring mounted within said hollow piston rod and arranged to oppose relative movement between said piston and said plunger and means for indicating the force exerted on said plunger by said second spring.

8. A force testing device as in claim 7 wherein the last mentioned means comprises a dial indicator arranged to measure the relative movement between said piston and plunger.

WILLIAM E. GARWOOD.